(12) United States Patent
Gerakoulis et al.

(10) Patent No.: US 8,134,913 B1
(45) Date of Patent: Mar. 13, 2012

(54) ULTRA-WIDE BANDWIDTH SYSTEM AND METHOD FOR IN-PREMISES WIRELESS NETWORKING

(75) Inventors: Diakoumis Parissis Gerakoulis, Dover, NJ (US); Saeed S. Ghassemzadeh, Andover, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

(21) Appl. No.: 11/637,750

(22) Filed: Dec. 13, 2006

Related U.S. Application Data

(63) Continuation of application No. 10/055,336, filed on Jan. 23, 2002, now Pat. No. 7,187,647.

(51) Int. Cl.
*H04J 11/00* (2006.01)

(52) U.S. Cl. ........ 370/208; 370/210; 370/330; 370/344; 370/366; 370/478; 370/480; 375/260; 725/81; 725/123; 725/148

(58) Field of Classification Search .................. 370/208, 370/210, 344, 366, 478, 480, 330; 375/140, 375/130, 242, 254, 243, 260, 261, 298; 725/81, 725/123, 118, 148
See application file for complete search history.

(56) References Cited

U.S. PATENT DOCUMENTS

| | | | |
|---|---|---|---|
| 5,425,050 A | 6/1995 | Schreiber et al. | |
| 6,282,185 B1 | 8/2001 | Hakkinen et al. | |
| 6,385,457 B1 | 5/2002 | Dam et al. | |
| 6,512,737 B1 | 1/2003 | Agee | |
| 6,804,521 B2 | 10/2004 | Tong et al. | |
| 6,882,619 B1 * | 4/2005 | Gerakoulis | 370/209 |
| 6,904,283 B2 | 6/2005 | Li et al. | |
| 6,934,340 B1 | 8/2005 | Dollard | |
| 7,035,201 B2 | 4/2006 | Fu et al. | |
| 7,133,355 B1 * | 11/2006 | Gerakoulis | 370/208 |
| 7,158,474 B1 * | 1/2007 | Gerakoulis | 370/206 |
| 7,187,647 B1 * | 3/2007 | Gerakoulis et al. | 370/208 |
| 7,289,494 B2 * | 10/2007 | Lakkis | 370/366 |
| 7,558,190 B2 * | 7/2009 | Sudo | 370/208 |
| 7,573,805 B2 * | 8/2009 | Zhuang et al. | 370/208 |
| 7,630,290 B1 * | 12/2009 | Gerakoulis | 370/206 |
| 7,738,358 B1 * | 6/2010 | Gerakoulis | 370/208 |
| 7,940,639 B2 * | 5/2011 | Gerakoulis | 370/206 |
| 2002/0105928 A1 * | 8/2002 | Kapoor et al. | 370/334 |
| 2003/0109217 A1 * | 6/2003 | Reed et al. | 455/3.05 |
| 2004/0190640 A1 * | 9/2004 | Dubuc et al. | 375/260 |
| 2007/0208884 A1 * | 9/2007 | Vanderaar et al. | 710/18 |
| 2007/0263741 A1 * | 11/2007 | Erving et al. | 375/260 |
| 2008/0043653 A1 * | 2/2008 | Lakkis | 370/310 |

FOREIGN PATENT DOCUMENTS

WO  WO 99/65155  * 12/1999

OTHER PUBLICATIONS

M.Z. Win and R.A. Scholtz, "Ultra Wide Bandwidth TimeHopping Spread-Spectrum Impulse Radio for Wireless Multiple Access Communications" *IEEE Trans. Commun.* vol. 48, No. 4, Apr. 2000, pp. 679-691.

(Continued)

*Primary Examiner* — Christopher Grey

(57) ABSTRACT

An IS-OFDM system for ultra-wideband (UWB) wireless communications that suppresses narrow-band interference, comprising an in-premises base station (IBS) is described. The IBS further comprises an IS-OFDM transceiver for communicating with a plurality of in-premises terminals (ITs) without creating interference outside an in-premises perimeter. Further, a method for operating an IS-OFDM system for ultra-wideband (UWB) wireless communications that suppresses narrow-band interference and provides local area networking services, in-premises distribution of broadcast cable channels and in-premises wireless access and routing to external networks is described, without creating interference outside an in-premises perimeter.

19 Claims, 8 Drawing Sheets

OTHER PUBLICATIONS

F. Ramirez-Mireles, "Performance of Ultrawideband SSMA Using Time Hopping and M-ary PPM" *IEEE Journal Selected Areas in Commun*, vol. 19, No. 6, Jun. 2001, pp. 1186-1196.

D. Cassioli, M.Z. Win and A.F. Molisch, "A Statistical Model for the UWB Indoor Channel" *IEEE Vehic. Techn. Conference* May 2001, Rhodes Greece.

* cited by examiner

N = 4096, M = 16, 32, 64: L = 256, 128, 64: AND N = LM.

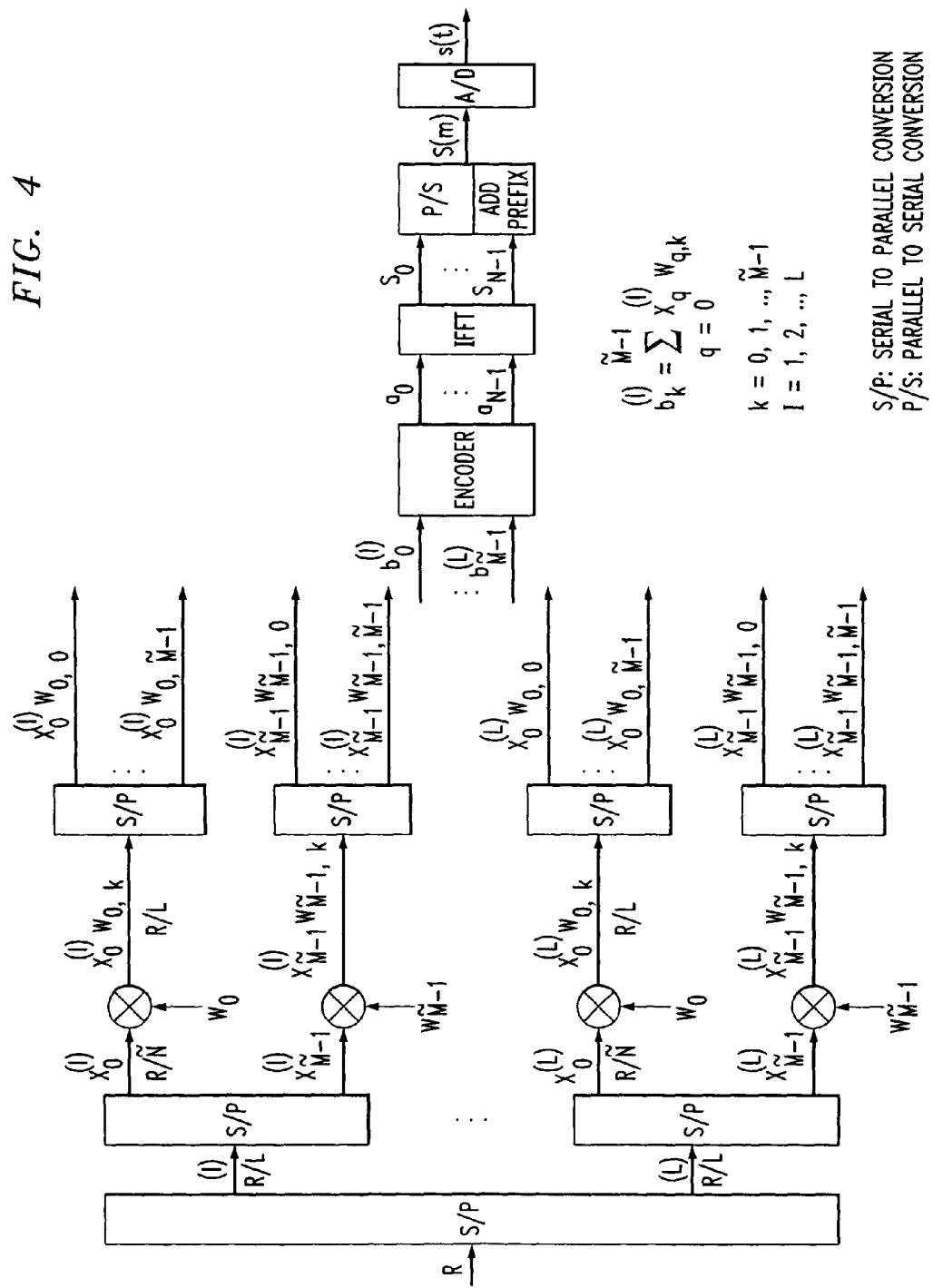

ULTRA-WIDE BANDWIDTH SYSTEM AND METHOD FOR IN-PREMISES WIRELESS NETWORKING

CROSS-REFERENCE TO RELATED APPLICATIONS

This is a continuation of U.S. patent application Ser. No. 10/055,336 filed on Jan. 23, 2002, the disclosure of which is expressly incorporated by reference into the present application.

FIELD OF THE INVENTION

The present invention relates generally to the field of telecommunications and particularly, to an ultra-wide bandwidth wireless network for in-premises wireless networking and wireless distribution of cable TV channels. Further, the physical link is based on interference suppressing (IS) orthogonal frequency division modulation (OFDM) (IS-OFDM) in order to suppress narrow-band interference.

BACKGROUND OF THE INVENTION

A wireless channel is said to be ultra-wide if its −20 dB bandwidth is wider than one quarter of its carrier (center) frequency. Ultra-wide bandwidth (UWB) radio technology has been used in the past for radar and remote sensing applications. Recently, however, the use of ultra-wide bandwidth technology has been proposed for use in wireless communications. An UWB communication channel has the advantage of providing single, integrated, homogeneous and seamless access for a wide variety of wireless services. The UWB radio system has its design based on a method similar to the one used in radar systems, which is the transmission of carrierless ultra-short (tenths of nsec) pulses or impulses. These impulses are transmitted at random or pseudo-random time intervals, in order to minimize other user interference in multiple access channels. This method is known as time-hopping impulse-radio (TH-IR).

The present invention uses ultra-wide bandwidth technology for wireless in-premises networking. In-home communications and networking are used as an example of in-premises communications and networking. An UWB wireless in-home network (WIN) will distribute cable TV channels and provide wireless links for Internet access and local area networking in every room of the home. The required bit rate for such a network is estimated to be 500 Mb/s or more. In order to meet such a bit rate requirement the proposed UWB system has to have an alternative design. Unlike the TH-IR, the UWB link presented herein has been designed in the frequency domain with a carrier in the frequency region of 6 GHz. Also, the present invention suppresses the narrow-band interference, which is often present in UWB channels.

SUMMARY OF THE INVENTION

The present invention is an ultra-wide bandwidth (UWB) wireless network for in-home wireless networking and wireless distribution of cable TV channels. Network services, the media access control, channels measurements, and the physical link transmitter and receiver design are described herein. The physical link is based on an IS-OFDM in which the total number of frequency bins (sub-carriers) of the UWB channel is divided into groups. Every frequency bin in a group will carry all transmitted symbols for that group, which are distinguished and separated from each other by orthogonal Hadamard sequences. The present invention suppresses narrow band interference, which is often present in UWB channels. The IS-OFDM link is also expected to satisfy the high bit rate needs and meet the required quality of service with a minimum transmit power so that it does not cause interference beyond the perimeter of the home.

The network of the present invention provides wireless services within residential homes. These services include: (a) Local area networking, (b) Wireless in-home distribution of broadcast cable channels and (c) In-home wireless access and routing to external (outdoor) networks.

The local area wireless networking services include broadcast video and in-home wireless data/voice networking. The local broadcast video service allows wireless video transmission from one VCR or DVD to one or more TV receivers. Also, the local in-home wireless network may deliver interactive data traffic between home PCs, provide wireless networking for control devices (i.e. thermostats, switches etc.) and intra-home voice communications, such as intercoms.

Wireless in-home distribution of broadcast cable TV channels may be distributed wirelessly to one or more TVs, thus avoiding wiring each room in the home with a cable TV jack. In this case, it is assumed that there is a need for simultaneously broadcasting within the home up to four TV channels.

The wireless in-home network (WIN) can also offer several in-home wireless links for voice and internet access, which avoids wiring to fixed locations. This, in turn, allows mobility to the subscriber within the home.

It is, therefore, an object of the present invention to provide wireless services within residential homes including local area networking, wireless in-home distribution of broadcast cable channel signals and in-home wireless access and routing to external (outdoor) networks.

BRIEF DESCRIPTION OF THE DRAWINGS

The invention is best described with reference to the detailed description and the following figure, where:

FIG. 4 is an IS-OFDM transmitter with N=LM.

DETAILED DESCRIPTION OF THE PREFERRED EMBODIMENTS

The method of delivering the wireless traffic for the above services should not be specific to the type of traffic or system originating it. For this reason, the received analog signal from an external source network or device will be sampled and pulse code modulated (PCM) in order to be transmitted over the WIN. In particular, a cable TV channel having a bandwidth of 6 MHz will be sampled at a rate of 12 Mb/s. Then, after using a 16-level PCM ($2^4=16$) this rate becomes 48 Mb/s (12 Mb/s×4). Assuming a forward error correction of rate ½, the resulting transmission rate for each TV channel will be 96 Mb/s and the required rate of having four simultaneous TV-channels transmissions is 384 Mb/s. Now, taking into account the other services described above, it is estimated that the total bit rate over the WIN needs to be 500 Mb/s or more.

The above traffic volume will be carried by the physical link, which will occupy a bandwidth of 1.25 GHz with carrier frequency in the region of 6 GHz. The physical link design is based on a type of orthogonal frequency division multiplexing (OFDM) called interference suppressing OFDM (IS-OFDM). The IS-OFDM provides N=4096 sub-carriers or frequency bins over the entire bandwidth. These frequency bins are divided into L groups with M bins per group (N=LM), where L=64, 128, 256 or 512 and correspondingly M=64, 32, 16 or 8. The IS-OFDM then allows each transmitting user to occupy some or all L groups of bins. In the case where a user does not transmit over all groups, a second user may transmit over those groups in which the first user does not. Given the fact that transmission over different bins from non-colocated (non-synchronous) users destroys orthogonality, the use of such a scheme with an ordinary OFDM is not feasible. IS-OFDM, however, allows simultaneous transmissions of different users over different groups by providing the capability of recovering the interfering symbols in adjacent groups.

Figure 1:
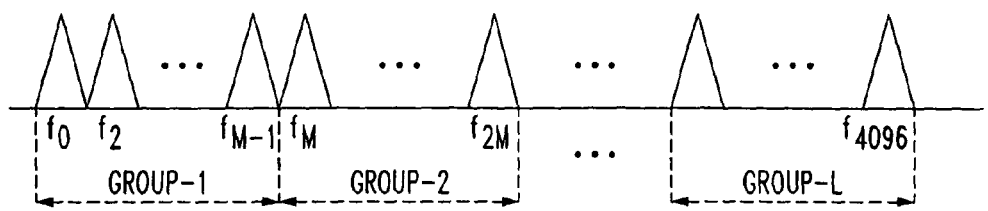
FIG. 1 shows the configuration of the physical link IS-OFDM sub-carriers in the UWB channel.

FIG. 1 shows the configuration of the physical link IS-OFDM sub-carriers in the UWB channel. Specifically, the 4096 bins are separated into L groups of M bins per group, for a total of N=LM=4096 bins. That is, if there are 256 groups, then there would be 16 bins per group. If there are 128 groups then there would be 32 bins per group. Each subcarrier center frequency is indicated by $f_i$, where i=1 . . . 4096. Each subcarrier 105 is indicated by a triangle which peaks at the subcarrier center frequency.

The WIN is comprised of one in-home base station (IBS) and a number of in-home terminals (IT). The IBS receives wired traffic from an external network and broadcasts it to the ITs within the home or receives the wireless transmissions from the ITs and routes their traffic to an external network. The ITs may also transmit or receive internal in-home traffic directly to or from other ITs.

Transmissions may take place simultaneously. The media access control is based on a point coordinated function which is provided by the IBS. More specifically, there is an assigned group of bins, called the control-group, for carrying control messages to and/or from the IBS. Before it transmits data, each IT sends a request via the control-group to the IBS. The IBS keeps a record of the on-going transmissions and the available bandwidth at any time. Based on the available and the requested bandwidth the IBS responds to the IT with a message granting or blocking the request. If a request is granted, then the response message also indicates the groups of bins in which the IT may transmit its data.

The design of the physical link is based on the method of interference suppressing orthogonal frequency division multiplexing (IS-OFDM) present in U.S. application Ser. No. 09/969,795 by Diakoumis Gerakoulis entitled "An Interference Suppressing OFDM System for Wireless Communications" filed Oct. 4, 2001, and U.S. application Ser. No. 09/969,868 by Diakoumis Gerakoulis entitled "An Interference Suppressing OFDM Method for Wireless Communications" filed Oct. 4, 2001, now U.S. Pat. No. 6,882,619 issued on Apr. 19, 2005, incorporated in their entirety herein by reference, which has been adjusted for use in UWB channels.

Before describing the IS-OFDM UWB wireless in-home network design, some indoor measurements of the UWB channel are presented. The channel measurements shown in FIGS. 2(*a*), 2(*b*) 3(*a*) and 3(*b*) were performed in many residential homes in the northern and central New Jersey area, using the technique of frequency swept channel sounding. The channel bandwidth and center frequency were 1.25 GHz and 5.25 GHz respectively.

Figure 2A:
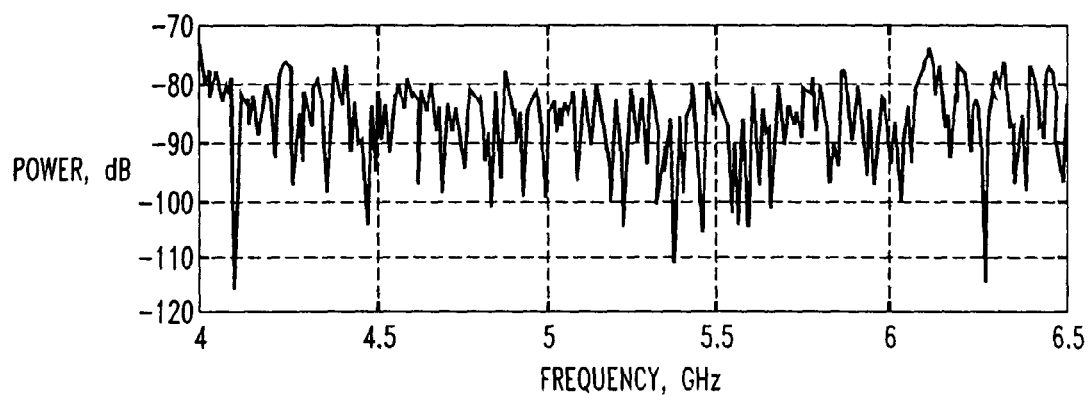
FIG. 2(a) illustrates a typical UWB non-line-of-sight (NLOS) frequency response.
Figure 2B:
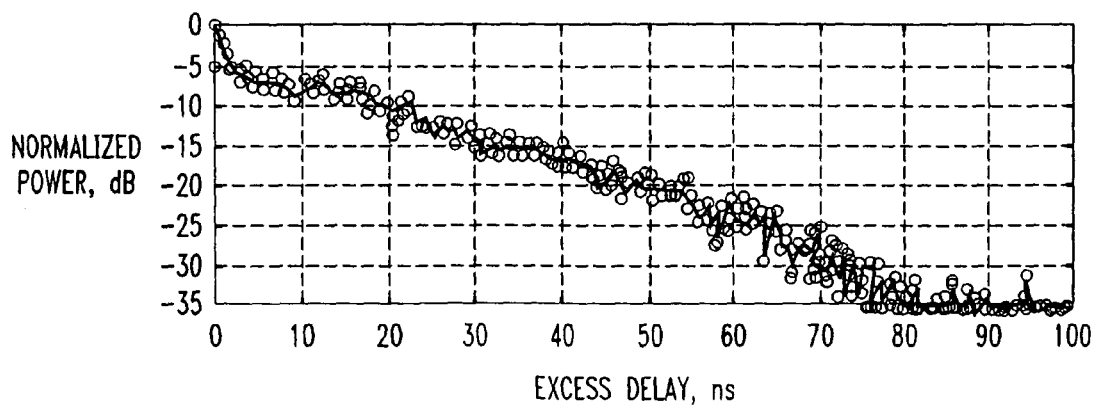
FIG. 2(b) illustrates a typical UWB NLOS impulse response.
Figure 3A:
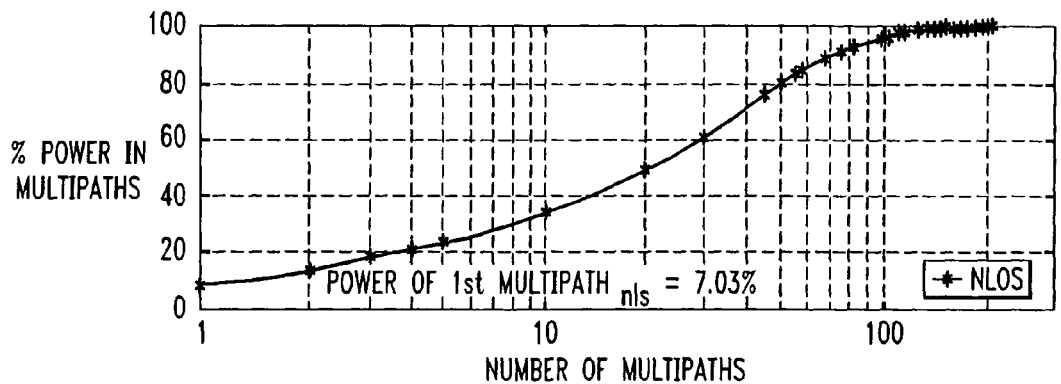
FIG. 3(a) shows the percentage of energy captured from each path.
Figure 3B:
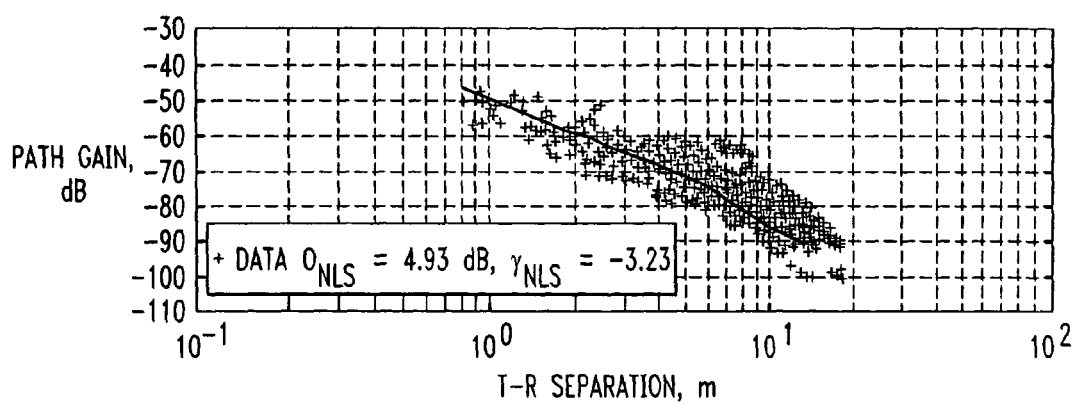
FIG. 3(b) shows the path loss as a function of distance.

FIG. 2(*a*) illustrates a typical UWB non-line-of-sight (NLOS) frequency response and FIG. 2(*b*) shows a typical NLOS impulse response of the UWB channel. Due to nature of the measurements, the channel frequency response did not exhibit significant variability in time and can be assumed time-invariant. The impulse response in FIG. 2(*b*) indicates that the mean excess delay is about 25 nsec while the RMS delay spread is 11 nsec. FIG. 3(*a*) shows the percentage of signal energy in each path. In almost all homes, the first returns were either blocked or scattered. By analyzing the time domain data it was found that on the average the first return only carried 7% of the total energy. Also, as shown, in order to collect 70% of the signal energy would require that about 40 paths were received. FIG. 3 (*b*) shows a scatter plot of measured path gains as a function of distance for all non-line-of-sight locations. The slope of the line is −3.2, corresponding to 32 dB loss/decade. The standard deviation about this line (median path loss) corresponds to shadow fading and is about 5.

In addition to the above propagation characteristics, the channel in its ultra-wide bandwidth will have significant interference from many narrow-band transmissions such as cell phones, radio stations, etc. Also, the system design of the present invention must obey Federal Communication Commission (FCC) rules on UWB emission limits so that the in-home transmissions does not cause interference outside the perimeter of the home.

The IS-OFDM transmitter design is shown in FIG. 4. The IS-OFDM transmitter includes a serial-to-parallel (S/P) converter 405, which accepts an input data stream and operates on the input data stream to produce a plurality of parallel data streams. A first plurality of S/P converters 410 is coupled to the S/P converter. Each of said first plurality of S/P converters accepts one of the parallel data streams and produces a plurality of parallel data sub-streams. A plurality of spreaders 415 is provided. Each of the plurality of spreaders 415 is coupled to one of the first plurality of S/P converters 410 and operates on one of the plurality of parallel data sub-streams, spreading one of the plurality of parallel data sub-streams by an orthogonal binary code sequence and resulting in a plurality of parallel spread data sub-streams separated from each other by orthogonal codes. A second plurality of S/P converters 420 accepts one of the plurality of parallel spread data sub-streams and produces a plurality of parallel data signals. An encoder 425 for encoding the plurality of parallel data signals produces a plurality of encoded data signals. An Inverse Discrete Fourier Transform (IDFT) 430 is coupled to the encoder and accepts the plurality of encoded data signals and produces a plurality of IDFT outputs. A parallel-to-serial (P/S) converter 435 is coupled to the IDFT and accepts the plurality of IDFT outputs and produces an intermediate IS-OFDM data signal comprising a plurality of frames. The P/S converter further adds a cyclic prefix to each frame of the intermediate IS-OFDM data signal to produce an IS-OFDM data signal. A digital-to-analog (D/A) converter 440 is coupled to the P/S converter and accepts the IS-OFDM data signal and produces an IS-OFDM transmit signal.

As shown, an input data stream of rate R bits/sec. enters a serial-to-parallel (S/P) converter which provides L parallel data streams. Each parallel stream of rate R/L enters a second S/P converter which provides M parallel sub-streams, each with rate R/N, where N=LM. At the output of the S/P converter, a data signal $x_q$ (T sec long) of a parallel stream q is spread by an orthogonal binary Hadamard code sequence $$w_q = [w_{q,0}, w_{q,2}, \ldots, w_{q,M-1}], \text{ for } q=0, \ldots, M-1$$

(the entire sequence of length T has to "overlay" a single data symbol also of length T). After the spreading operation the signal rate is R/L bits/sec. Assuming that $x_q^{(l)}$ represents a complex-valued signaling point in a QAM constellation, i.e., $x_q^{(l)} = \alpha_q^{(l)} + j\beta_q^{(l)}$, the spread signal is given by $$x_q^{(l)} w_{q,k} = \alpha_q^{(l)} w_{q,k} + j\beta_q^{(l)} w_{q,k} \quad (1)$$

where, k=0, M−1 and l=1, . . . , L. Define $$b_q^{(l)} = \sum_{q=0}^{\tilde{M}-1} x_q^{(l)} w_{q,k} \quad (2)$$

where, k=0, M−1 and l=1, . . . , L. For any pair (k, 1) define, $$\Re\{b_0^{(l)}\} = \sum_{q=0}^{M-1} \alpha_q^{(l)} w_{q,0} \text{ for } i=0$$

$b_k^{(l)}$ for i=Kl+l−1; and for every (k,l)≠(0,1)

$$a_i \Im\{b_0^{(l)}\} = \sum_{q=0}^{M-1} \beta_q^{(l)} w_{q,0} \text{ for } i=N \quad (3)$$

In the above equation it is assumed that N=LM and N=2N This process takes place in the encoder which provides N parallel points $a_i$ to the input of the IDFT, the output of which is given by $$s_n = \frac{1}{\sqrt{N}} \sum_{i=0}^{N-1} a_i e^{j2\pi(in/N)} \text{ for } n = 0, 1, \ldots, N-1 \quad (4)$$

Now, use the matrix $D_M$ shown below for representing the distribution of the transmitted symbols over the frequency bins of the UWB channel.

$$D_M = \begin{matrix} x_0^{(1)} & \ldots x_0^{(1)} & |\ldots| & x_0^{(L)} & \ldots x_0^{(L)} & \leftarrow w_0 \\ x_1^{(1)} & \ldots x_1^{(1)} & |\ldots| & x_1^{(L)} & \ldots x_1^{(L)} & \leftarrow w_1 \\ \ldots & \ldots & |\ldots| & \ldots & \ldots & \\ x^{(1)} & \ldots x^{(1)} & |\ldots| & x^{(L)} & \ldots x^{(L)} & \leftarrow w_{M-1} \\ \tilde{M}-1 & \tilde{M}-1 & & \tilde{M}-1 & \tilde{M}-1 & \\ \uparrow & \uparrow & & \uparrow & \uparrow & \\ f_0 & f_{M-1} & & f_{N-M-1} & f_{N-1} & \end{matrix}$$

As shown, there are L sets or groups of bins with M frequency bins per group, so that N=LM. Then, every frequency bin in a set L contains all data points $x_q^{(l)}$ for q=0, . . . , M−1. This means that the transmitted power of each symbol is distributed over the M frequency bins of that set. Therefore, if one or more bins are corrupted by narrow-band interference, the affected symbols can be recovered from the remaining bins.

If it is assumed L=1, then the resulting system having N=M is the basic IS-OFDM. In addition, if the spreading orthogonal Hadamard matrix $W=[w_1, w_2, \ldots, w_N]^T$ is replaced with an identity matrix W=I, the resulting system is the ordinary OFDM. Also, if we take M=1 and N=L, the resulting system is again the ordinary OFDM. The parameter value of N for the UWB channel of about 1.25 GHz is chosen to be N=4096 frequency-bins. These bins are divided into L=64, 128, 256 or 512 sets or groups, with corresponding values of M=64, 32, 16 and 8 bins per group as shown in FIG. 1.

Figure 5:
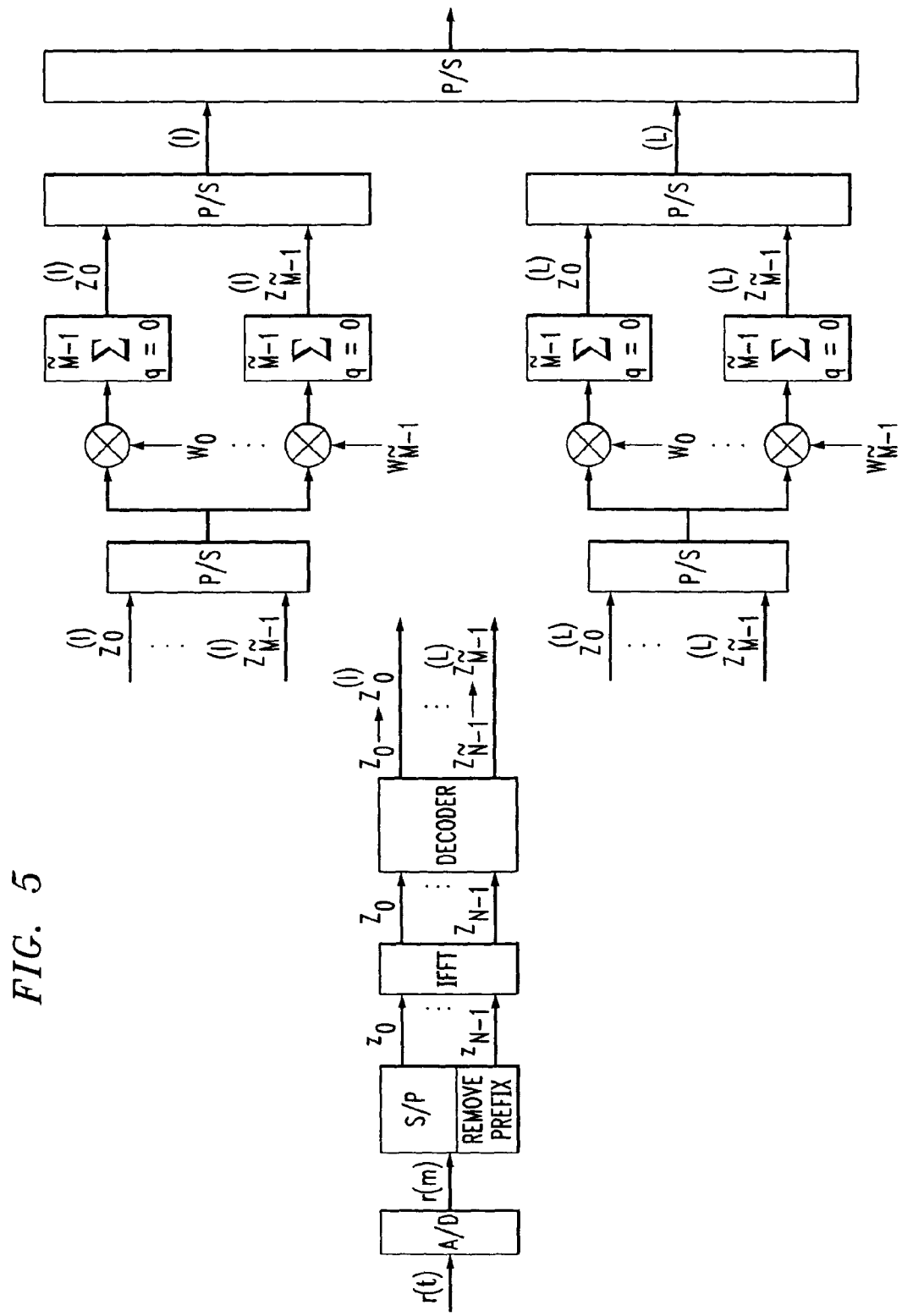
FIG. 5 is an IS-OFDM receiver with N=LM.

The receiver design is shown in FIG. 5. The IS-OFDM receiver includes an analog-to-digital (A/D) converter 505, which accepts a received analog signal and operates on the received analog signal to produce a digital received signal. A serial-to-parallel (S/P) converter 510 is coupled to the A/D converter and accepts the digital received signal, which comprises a plurality of frames. The S/P converter operates on the digital received signal to produce a plurality of parallel received data points and further operates on the digital received signal to remove a cyclic prefix from each frame. A Discrete Fourier Transform (DFT) 515 is coupled to the S/P converter and accepts the plurality of parallel received data points and operates on the plurality of parallel received data points to produce complex data signal points. A decoder-demapper 520 is coupled to the DFT and accepts the complex data signal points and operates on the complex data signal points to produce a plurality of parallel data points. A first plurality of parallel-to-serial (P/S) converters 525 is coupled to the decoder-demapper. The first plurality of P/S converters accepts the plurality of parallel data points, and operates on the plurality of parallel data points to produce a serial data stream. A plurality of despreaders 530 is coupled to one of the plurality of P/S converters and accepts said serial data stream and operates on the serial data stream in parallel with a plurality of code sequences to produce despread data signals. A plurality of accumulators 535, with each accumulator coupled to one of the plurality of despreaders. The plurality of accumulators accepts the despread data signals and operates on the despread data signals to produce accumulated data streams. A second plurality of P/S converters 540 is coupled to the plurality of accumulators. Each of the plurality of P/S converters accepts the accumulated data streams and operates on the accumulated data streams to produce an intermediate recovered data stream. A P/S converter 545 is coupled to the second plurality of P/S converters and accepts the intermediate recovered data streams and operates on the intermediate recovered data streams to produce a recovered data stream. AN IS-OFDM transmitter and an IS-OFDM receiver may be combined and referred to as an IS-OFDM transceiver.

As shown, the received signal enters an IS-OFDM receiver, which provides N parallel outputs $Z_k^{(l)}$.

$$Z_k^{(l)} = b_k^{(l)} * H_k^{(l)} + I_k^{(l)} + J_k^{(l)} + n_k^{(l)} \quad (5)$$

where $H_k^{(l)}$ is the transfer function of the channel at frequency bin k in group l, $I_k^{(l)}$ is the intersymbol and interchannel interference, $J_k^{(l)}$ is the narrow-band interference and $n_k^{(l)}$ is the AWGN. Also, $b_k^{(l)} = \sum_{q=0}^{M-1} x_q^{(l)} w_{q,k}$ for k=0, 1, M−1 and l=1, . . . , L. As shown in FIG. 5, in each group l, the signal $Z_k^{(l)}$ enters a parallel-to-serial (P/S) converter the outputs of which are despread by the orthogonal sequences for recovering the data. The output of the despreader 0 of group l=1 is given by $$Z_0^{(1)} = \sum_{k=0}^{\tilde{M}-1} Z_k^{(1)} w_{0,k} = \sum_{k=0}^{\tilde{M}-1} [b_k^{(1)} H_k^{(1)} + I_k^{(1)} + J_k^{(1)} + n_k^{(1)}] w_{0,k} \quad (6)$$

The useful signal (represented by the first term above) provides the data $x_0^{(l)}$ at the output of the despreader 0, as shown below $$\sum_{k=0}^{\tilde{M}-1} b_k^{(1)} H_k^{(1)} w_{0,k} = \qquad (7)$$

$$H^{(1)} \sum_{k=0}^{\tilde{M}-1} \left[ \sum_{q=0}^{\tilde{M}-1} x_q^{(1)} w_{q,k} \right] w_{0,k} = H^{(1)} \sum_{q=0}^{\tilde{M}-1} x_q^{(1)} \sum_{k=0}^{\tilde{M}-1} w_{q,k} w_{0,k}$$

$$\begin{cases} H^{(1)} \tilde{M} x_0^{(1)} & \text{for } q = 0 \\ 0 & \text{for } q \neq 0 \end{cases}$$

The above derivation is based on the assumption that the channel is frequency-flat within each frequency bin group l, that is, $H_k^{(l)} = H^{(l)}$ is constant for k=0, 1, 2, ..., M−1. In order to satisfy this condition, a narrow group-width (narrower than the channel's coherent bandwidth) is chosen or each $H_k^{(l)}$ is compensated (the compensation is based on the channel estimation $H_k^{(l)}$ of each bin).

Given the value of N=4096, the choices of the system parameters L and M are such that the group-width is narrower than the coherence bandwidth of the channel and the group-width is wide enough to have the capability to suppress narrow-band interference (since interference can only be suppressed if it has narrower bandwidth than the width of each group of bins). Therefore, given that each bin is about 300 kHz, the UWB channel has delay spread less than 25 nsec, and assuming that the bandwidth of each interferer is less than 600 kHz, the best estimated values are M=8, 16 or 32, which correspond to L=512, 256 or 128, respectively. That is, to have each group-width equal to 2.5, 5 or 10 MHz, then each of the L parallel receptions will maintain a satisfactory quality.

Also, considering the requirement that the in-home transmission power should be low enough so that it does not cause interference outside the perimeter of the home, the link's BER performance can be enhanced by using an appropriate FEC channel encoder.

An ultra-wide bandwidth wireless in-home network has been described. This includes network services, media access control, channels measurements and the transmitter and receiver designs. The UWB IS-OFDM wireless in-home network of the present invention broadcasts cable TV channels within the home and provides wireless networking and access to external networks at a total estimated bit rate 500 Mb/s. The physical link design of the present invention is based on an IS-OFDM in which the total number of frequency bins in the UWB channel is divided into groups. All bins in each group will carry all transmitted symbols for that group, which are distinguished and separated from each other by orthogonal Hadamard sequences. Such a system then suppresses narrow-band interference and avoids the effects of frequency selective fading by choosing the group-width to be wider than the interference bandwidth and narrower than the UWB channel's coherent bandwidth. The IS-OFDM link is also expected to satisfy the bit rate needs and meet the required quality of service with a minimum transmit power so that it does not cause interference beyond the perimeter of the home. Finally, the proposed system provides multiple access capability by allowing independent users to transmit asynchronously in different groups of bins.

Simulations have been performed for a UWB channel with bandwidth about 1.25 GHz with the following results. The value of the parameter N is chosen to be N=4096 frequency bins, which corresponds to a bin-width of about Δf=305 kHz. The results of the system performance experiments are given below for two different channel types: (a) a Narrow-Band Interference and average white Gaussian noise (AWGN) channel, and (b) an Inter-Symbol and Inter-Channel Interference channel based on indoor propagation measurements. The bit error rate (BER) performance results are presented for different values of the parameters M and L (M=N/L) and with QPSK modulation in all sub-carrier frequencies.

For the narrow-band interference channel, the uncoded bit error probability due to a narrow band interference (NBI) and AWGN the performance results obtained by computer simulation are presented below. The parameter M is set to be M=64, so that L=4096/64=64. This corresponds to a width of the basic IS-OFDM band, B=20 MHz.

The NBI is modeled as a Gaussian process with constant one-sided spectral density $\sigma_i^{(NB)}$, and total bandwidth $\Sigma_i W_i^{(nb)} \sim 10$ MHz. The process is the output of a 20-tap linear bandpass frequency impulse response (FIR) filter, characterized by a stop-band attenuation equal to −30 dB, driven at the input by a Gaussian sequence.

The uncoded BER of the UWB system is equal to the average BER, of the L basic IS-OFDM bands. This is true because all L bands are orthogonal to each other in an AWGN channel and only the basic IS-OFDM has NBI rejection capability. Hence, the performance results given below are those of a basic IS-OFDM system with bandwidth B≈20 MHz.

Figure 6:
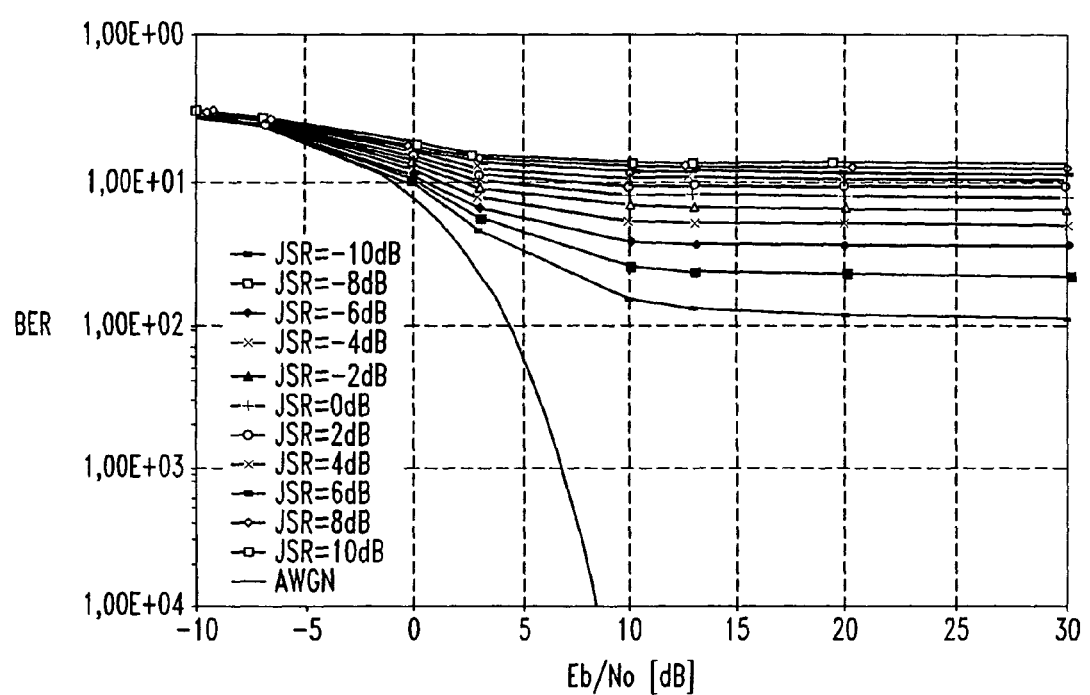
FIG. 6 shows the average bit error rate probability (BER) of the ordinary OFDM system versus the $E_b/N_0$ [dB] ($N_0$ is the power spectral density of the average white Gaussian noise (AWGN)) and the JSR as a parameter with the values considered above.
Figure 7:
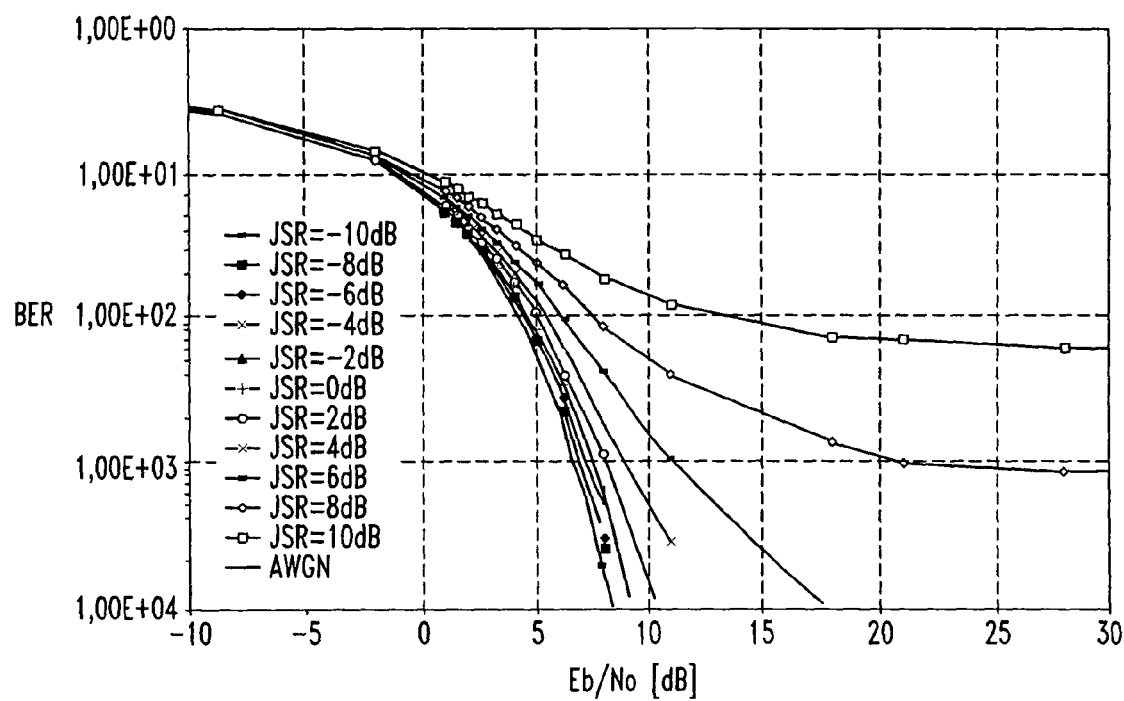
FIG. 7 shows the average bit error rate probability (BER) of the basic IS-OFDM system versus the $E_b/N_0$ [dB] with the narrowband interference power to signal ratio JSR as a parameter.

The uncoded bit error probability in a basic IS-OFDM band has been evaluated for power of interference to signal ratios JSR=−10, −8, ..., +8, +10 dBs. JSR is defined as the ratio $JSR = P_I/P_S$, where $P_I$ is the average interference power and $P_S$ is the average transmitted signal power. FIGS. 6 and 7 show the performance results for the ordinary OFDM and basic IS-OFDM systems respectively. The ordinary OFDM has been generated from the basic IS-OFDM by taking an identity matrix instead of a Hadamard matrix, so that the two systems are equivalent.

FIG. 6 shows the average bit error rate probability (BER) of the ordinary OFDM system versus the $E_b/N_0$, [dB] ($N_0$ is the power spectral density of the average white Gaussian noise (AWGN) and the JSR as a parameter with the values considered above). The performance curve for an AWGN channel is taken as a benchmark. As is observed, there is a significant BER floor when $E_b/N_0 > 10$ dB. For a target BER equal to $2 \times 10^{-2}$, a shifting of 5 dB is visible for lower values of JSR, e.g. JSR=−10 dB. This penalty grows drastically for any higher value of interference power, and it becomes unbearable. In such a case, an FEC coding would not significantly improve the system performance.

FIG. 7 shows the average bit error rate probability (BER) of the basic IS-OFDM system versus the $E_b/N_0$ [dB] with the narrowband interference power to signal ratio JSR as a parameter. Performance results indicate that the degradation induced by narrowband interference (NBI) is less than 2 dB for JSR S 0 dB and for BER=$10^{-3}$, instead of infinity in the case of ordinary OFDM. The BER for IS-OFDM can be less than $2 \times 10^{-2}$, even if JSR=10 dB.

Hence, as shown by the above simulation results, the IS-OFDM system has a significant $E_b/N_0$ gain over the ordinary OFDM in a NBI with AWGN channel, which tends to become infinite when the error floor of the ordinary OFDM is above a target BER.

Simulation results of the UWB IS-OFDM system for an indoor UWB multipath channel are now presented. The results provide the uncoded BER with the following system parameter values:

parameter N=4096 and M=32, 64, 128 and 256
corresponding values of L are, L=128, 64, 32 and 16. (since N=LM).

Given the UWB channel bandwidth $B_U=1.25$ GHz, the widths of each basic IS-OFDM band are B=10, 20, 40 and 80 MHz corresponding to the values of M=32, 64, 128 and 256. Also, the system data modulation is QPSK in all frequency bins and perfect channel estimation at the receiver is assumed.

The channel delay spread has been taken $\tau=58$ nsec and the coherence bandwidth is $(\Delta f)_c \cong 17$ MHz. This value of i occurs at a threshold of 20 dB below maximum return for which 99.4% of total signal power is collected. The signal amplitude is considered to have a Ricean distribution model with factor K=10 dB.

The encoded BER of the UWB IS-OFDM system has been calculated by taking the average BER of the L basic IS-OFDM bands and considering the additional ICI/ISI interference contributed by the adjacent (upper and lower) bands. Moreover the ICI/ISI interference has been set equal to $5 \times 10^{-5}$.

Figure 8:
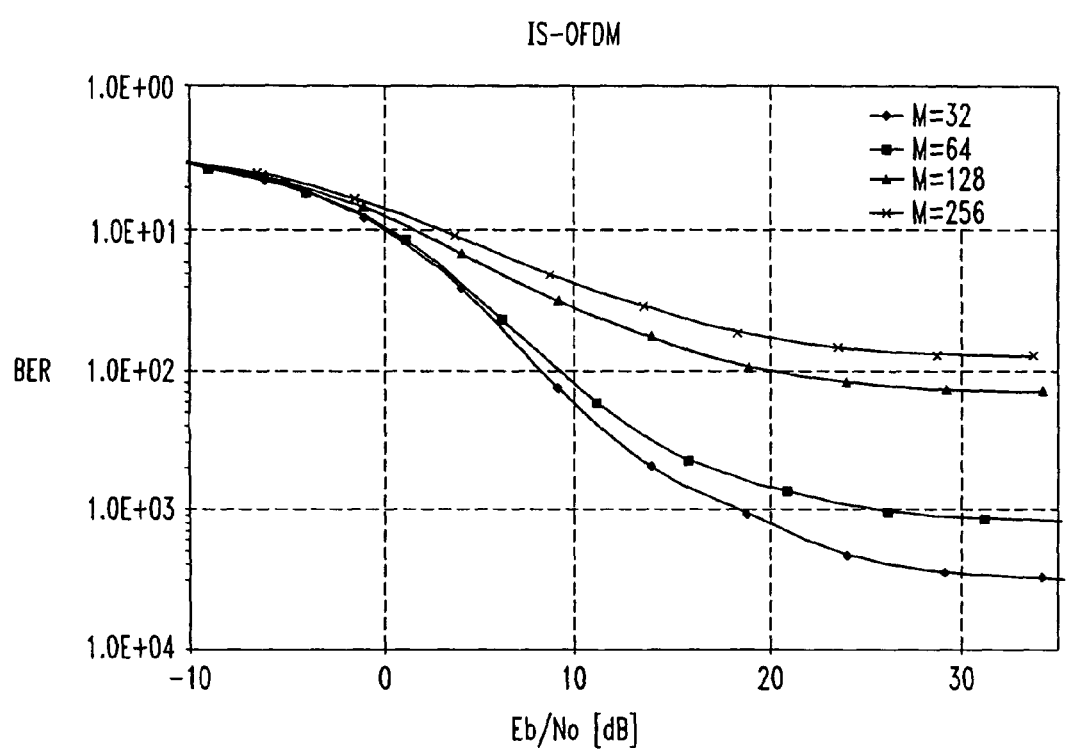
FIG. 8 shows the uncoded average bit error rate probability versus $E_b/N_0$ [dB] of a basic IS-OFDM in the UWB channel.

FIG. 8 shows the uncoded average bit error rate probability versus $E_b/N_0$ [dB] of a basic IS-OFDM in the UWB channel. As is observed, the BER performance degrades for increasing values of M. That is, among the values of M shown, M=32 has the best and M=256 has the worst BER performance. The reason is the loss of orthogonality due to frequency selective fading. Given that the width of a basic IS-OFDM block for M=32 is B≈10 MHz, the channel frequency response appears to be flat (non-frequency selective) since $(\Delta f)^c > B$. However, as the value of M increases, (i.e., for M=64, 128 and 256 corresponding to B≈20, 40, 80 MHz) the frequency selectivity of the channel increases, which introduces a noise caused by the loss of orthogonality. This is in addition to the ICI/ISI interference considered above, which is taken to be $5 \times 10^{-5}$. On the other hand, if M<<32, the BER performance may degrade again since the band B may not be sufficiently wide for the system to be resistant to narrow-band interference and deep narrow-band frequency fades.

Figure 9:
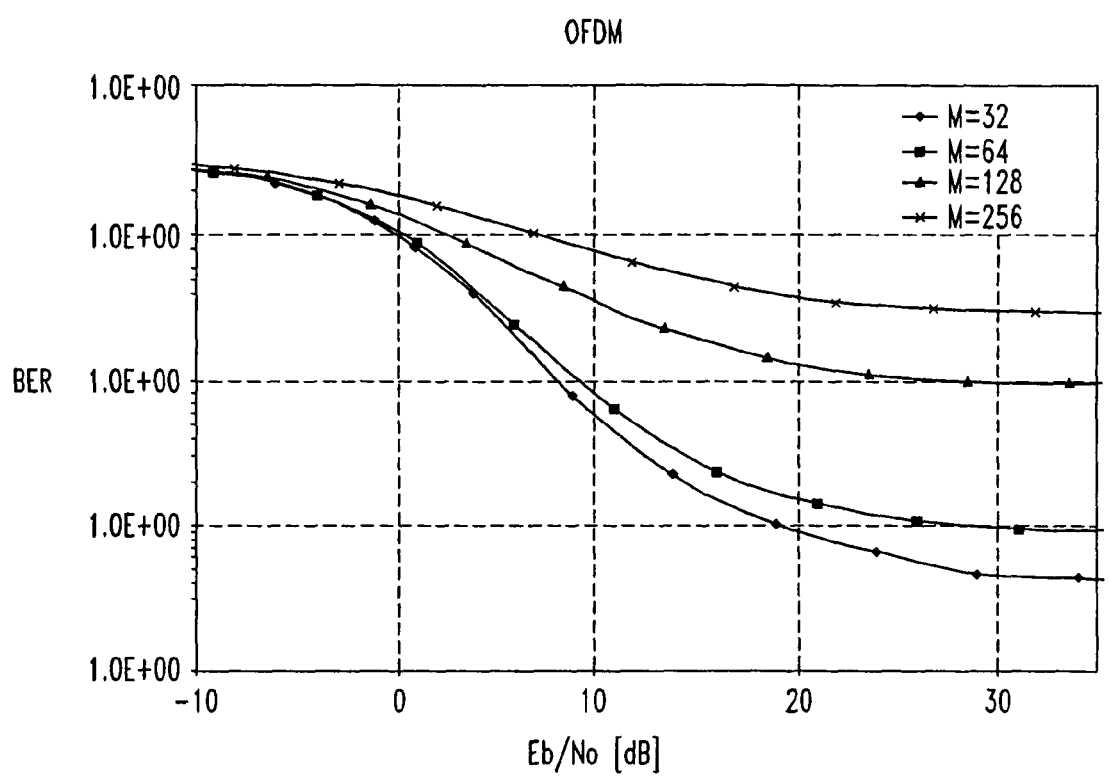
FIG. 9 shows the uncoded BER of an equivalent ordinary OFDM system with M=32, 64, 128 and 256 frequency bins.

Compare the above IS-OFDM with an equivalent ordinary OFDM system under the same channel conditions. FIG. 9 shows the uncoded BER of an equivalent ordinary OFDM system with M=32, 64, 128 and 256 frequency bins. If FIGS. 8 and 9 are compared, the BER performance of the IS-OFDM and ordinary OFDM systems for M=32 are about the same. For M≧64 however, the OFDM performance deteriorates more than the IS-OFDM. This advantage of the IS-OFDM over the ordinary OFDM becomes greater as the value of M increases. This means that the OFDM BER performance is completely unacceptable for M>256 (or B>80 MHz). Therefore, the ordinary OFDM cannot offer acceptable performance in UWB channel applications, (i.e., when M=N=4096). The IS-OFDM then is the alternative UWB frequency domain system which can offer the best performance for the given channel type when M=32 (or B>10 MHz) and L=128 (L=N/M=4096/32).

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

What we claim is:

1. An interference-suppressing orthogonal frequency division modulation system comprising:
    an in-premises ultra-wide bandwidth network that includes, an in-home base station and an in-home terminal, the in-home base station including:
    an interference-suppressing orthogonal frequency division modulation transceiver configured to communicate with the in-home terminal and including an interference-suppressing orthogonal frequency division modulation receiver and an interference-suppressing orthogonal frequency division modulation transmitter;
    wherein the interference-suppressing orthogonal frequency division modulation receiver is configured to receive a data signal comprising a plurality of data points from a network external to the in-premises ultra-wide bandwidth network; and
    wherein the interference-suppressing orthogonal frequency division modulation transmitter is configured to broadcast the data signal that is received to the in-home terminal, the data signal that is received being divided into a first plurality of L frequency groups, each of the L frequency groups being further divided into a second plurality of M orthogonal frequency bins to reduce ultra-wide bandwidth emissions where L and M are integers, and each of the M orthogonal frequency bins receiving a data stream containing the plurality of data points in the received data signal, wherein any one of the plurality of data points in the data signal that is received designated for a particular frequency group is recoverable from any one of the plurality of M orthogonal frequency bins within the particular frequency group, wherein two of the L frequency groups include transmissions from two different users, wherein each group of the L frequency groups comprises a plurality of adjacent frequency bins and each group of the L frequency groups is assigned to a single user, wherein the M orthogonal frequency bins in each group of the L frequency groups are separated from each other by orthogonal hadamard sequences.

2. The interference-suppressing orthogonal frequency division modulation system of claim 1, wherein the data signal that is received comprises a plurality of N frequency bins over a bandwidth, the plurality of N frequency bins being divided into the first plurality of L frequency groups and the first plurality of L frequency groups being further divided into the second plurality of M orthogonal frequency bins, wherein N, L, and M are integers, and N=L*M.

3. The interference-suppressing orthogonal frequency division modulation system according to claim 1, wherein the in-home base station receives wired traffic signals from the network external to the in-premises ultra-wide bandwidth network and is configured to broadcast the wired traffic signals that are received to the in-home terminal.

4. The interference-suppressing orthogonal frequency division modulation system according to claim 1, wherein the in-home base station is configured to receive wireless communications from the in-home terminal and route the wireless communications from the in-home terminal to the network external to the in-premises ultra-wide bandwidth network.

5. The interference-suppressing orthogonal frequency division modulation system according to claim 4, wherein the in-home terminal is configured for transmitting and receiving internal wireless communications with another in-home terminal.

6. The interference-suppressing orthogonal frequency division modulation system according to claim 1, wherein one of the first plurality of L frequency groups is assigned to be a control group for carrying control messages between the in-home base station and the in-home terminal.

7. The interference-suppressing orthogonal frequency division modulation system according to claim 6, wherein the in-home base station is configured to keep a record of on-going transmissions and available bandwidth.

8. The interference-suppressing orthogonal frequency division modulation system according to claim 7, wherein each in-home terminal sends a request to transmit data to the in-home base station via the control group before attempting to transmit any data.

9. The interference-suppressing orthogonal frequency division modulation system according to claim 8, wherein the in-home base station responds to the request to transmit data with one of: a message granting the request to transmit data and a message denying the request to transmit data.

10. The interference-suppressing orthogonal frequency division modulation system according to claim 9, wherein the message granting the request to transmit data further contains an identification of which of the first plurality of L groups of M orthogonal frequency bins in which the in-home terminal are for transmitting data.

11. The interference-suppressing orthogonal frequency division modulation system according to claim 1, wherein the interference-suppressing orthogonal frequency division modulation system provides at least one of: local area networking services, wireless distribution of broadcast cable channels, and wireless access and routing to networks external to the in-premises ultra-wide bandwidth network.

12. A method for operating an interference-suppressing orthogonal frequency division modulation comprising:
providing an in-premises ultra-wide bandwidth network configured to provide a local area networking service, a wireless distribution of a signal, and wireless access and routing to a network external to the in-premises ultra-wide bandwidth network;
converting an input data stream into a first plurality of data sub-streams having a first plurality of L frequency groups; and
converting each of the first plurality of L frequency groups of data sub-streams into a second plurality of orthogonal data sub-streams having a second set of M orthogonal frequency bins to reduce interference outside a perimeter, where L and M are integers, wherein the input data stream includes a plurality of data points and each of the second plurality of orthogonal data sub-streams contains all data points contained in the input data stream, wherein two of the L frequency groups include transmissions from two different users, wherein each group of the L frequency groups comprises a plurality of adjacent frequency bins and each group of the L frequency groups is assigned to a single user, wherein the M orthogonal frequency bins in each group of the L frequency groups are separated from each other by orthogonal hadamard sequences.

13. A method for operating an interference-suppressing orthogonal frequency division modulation comprising:
receiving at an in-premises ultra-wide bandwidth network an input data stream containing a plurality of data points from a source external to the in-premises ultra-wide bandwidth network;
converting the input data stream into a first plurality of L frequency groups;
converting each of the first plurality of L frequency groups into M orthogonal frequency bins to reduce ultra-wide bandwidth emissions outside a perimeter of the in-premises ultra-wide bandwidth network; and
receiving a first orthogonal data sub-stream, the first orthogonal data sub-stream being at a frequency contained within one of the M orthogonal frequency bins and containing one of the plurality of data points contained in the input data stream, where L and M are integers, wherein two of the L frequency groups include transmissions from two different users, wherein each group of the L frequency groups comprises a plurality of adjacent frequency bins and each group of the L frequency groups is assigned to a single user, wherein the M orthogonal frequency bins in each group of the L frequency groups are separated from each other by orthogonal hadamard sequences.

14. The method of claim 13, wherein the first orthogonal data substream contains all of the plurality of data points contained in the input data stream.

15. The method of claim 14, further comprising:
receiving a second orthogonal data sub-stream, the second orthogonal data sub-stream being at a frequency contained within one of the M orthogonal frequency bins; and
retrieving a data point from the second orthogonal data substream.

16. A base station for interference-suppressing orthogonal frequency division modulation within an in-premises ultra-wide bandwidth network comprising:
an interference-suppressing orthogonal frequency division modulation transceiver configured to communicate with an in-home terminal and including:
an interference-suppressing orthogonal frequency division modulation receiver configured to receive a data signal having a plurality of data points from a network external to the in-premises ultra-wide bandwidth network; and
an interference-suppressing orthogonal frequency division modulation transmitter configured to broadcast a data signal to the in-home terminal, the data signal being divided into a first plurality of L frequency groups, each of the first plurality L frequency groups being further divided into a second plurality of M orthogonal frequency bins to reduce ultra-wide bandwidth emissions outside a perimeter of the in-premises ultra-wide bandwidth network, where L and M are integers, and each of the second plurality of M orthogonal frequency bins receives a data stream containing the plurality of data points in the data signal wherein any one of the plurality of data points in the data signal designated for a particular frequency group is recoverable from any one of the second plurality of M orthogonal frequency bins within the particular frequency group, wherein two of the L frequency groups include transmissions from two different users, wherein each group of the L frequency groups comprises a plurality of adjacent frequency bins and each group of the L frequency groups is assigned to a single user, wherein the M orthogonal frequency bins in each group of the L frequency groups are separated from each other by orthogonal hadamard sequences.

17. An in-home terminal configured for use in an interference-suppressing orthogonal frequency division modulation system in an in-premises ultra-wide bandwidth network including a receiver configured to receive a signal transmitted over a frequency and a transmitter configured to transmit data to one of an in-home base station or a second in-home terminal, the data being transmitted over one of a first plurality of L frequency groups, the first plurality of L frequency groups being further divided into a second plurality of M frequency bins, wherein the transmitted signal comprises a plurality of data points designated for a particular frequency group, and wherein the transmitted signal is recoverable from any one of the second plurality of M frequency bins within the particular frequency group, wherein two of the L frequency groups include transmissions from two different users, wherein each group of the L frequency groups comprises a plurality of adjacent frequency bins and each group of the L frequency groups is assigned to a single user, wherein the M orthogonal frequency bins in each group of the L frequency groups are separated from each other by orthogonal hadamard sequences.

18. The in-home terminal of claim 17, being further configured to send a request to transmit signal to the in-home base station before transmitting data to one of the in-home base station and the second in-home terminal and being further configured to receive a response from the in-home base station, the response comprising one of: a message granting the request to transmit signal and a message blocking the request to transmit signal.

19. The in-home terminal of claim 18, wherein the message granting the request to transmit signal indicates which of the first plurality of L frequency groups and the second plurality of M frequency bins is used for transmission.

* * * * *